Patented Mar. 26, 1935

1,995,817

UNITED STATES PATENT OFFICE 1,995,817

CONCENTRATION OF MINERALS

Oliver C. Ralston, Clarkdale, Ariz., assignor to United Verde Copper Company, Clarkdale, Ariz., a corporation of Delaware No Drawing. Application September 25, 1929 Serial No. 395,181

9 Claims. (Cl. 209—167)

This invention relates to froth flotation and has for an object the provision of an improved process for differential flotation of complex ores. More particularly the invention contemplates the provision of an improved froth flotation process for treating ores containing sulfides of zinc, copper and iron.

According to some present customary practices, ores containing copper, zinc and iron sulfides are treated for the separate removal of zinc and copper sulfides. The processes employed generally involve the use of a low causticity pulp for the recovery of copper sulfide and the subsequent use of a higher causticity pulp together with an activating agent such, for example, as copper sulfate for the recovery of zinc sulfide. The results of such processes are, for the most part, entirely unsatisfactory, and, in the treatment of the usual ore, a large proportion of the zinc sulfide is mixed with the copper concentrate.

I have discovered that one of the main reasons for the difficulties involved in treating mixed zinc-copper-iron sulfide ore is the fact that frequently a part or all of the zinc sulfide minerals is already activated when the ore reaches the flotation machine. This is particularly true in cases in which the ore is either in nature or after mining is subjected to oxidation influences. In such cases, the copper minerals produce oxidation products which react with and activate the zinc sulfide mineral particles with the result that a relatively large proportion of the zinc sulfide particles are substantially as readily amenable to flotation as are the copper sulfide particles.

I believe the above described condition of the zinc sulfide particles has not been known or appreciated heretofore, and, consequently, in the development of the present customary flotation processes, no definite provision has been made for deactivation of the zinc sulfide particles prior to subjecting the ore to a flotation operation for the recovery of copper sulfide. It is my understanding of the existence of activated zinc sulfide particles in copper-zinc-iron sulfide ore which has enabled me to devise my process for recovering the bulk of the copper and zinc sulfides in separate concentrates.

According to the process of my invention, the ore in the form of a pulp is subjected to the action of a solvent capable of removing the copper compounds from the surfaces of the zinc sulfide particles, and subsequently subjected to a flotation operation for the recovery of copper sulfide. After removal of the copper concentrate, the zinc sulfide mineral particles are reactivated and subsequently recovered by flotation.

As a result of my investigations, it appears that the activated conditions of the zinc sulfide mineral particles are due to the existence of films of copper sulfide on the surfaces thereof. This belief is supported by the fact that such solvents of copper sulfide as alkali and alkaline earth cyanides and mixtures of thiosulfates and cyanides may be used for deactivating the zinc sulfide particles.

A complete process of my invention consists in treating the mixed zinc-copper-iron sulfide ore pulp with a solution of a soluble alkali or alkaline earth cyanide, preferably properly protected by alkalinity due to lime. The cyanide solution is known to be consumed by any of the above sulfides but as long as a sufficient excess of cyanide is present no films or precipitates of the reaction products are formed but complex cyanides go into solution. Copper sulfide, such as cupric and cuprous sulfide (including that supposed to be as a film on zinc sulfide particles) is known to be dissolved by a cyanide solution and one would therefore expect a zinc sulfide mineral particle which has been activated by copper compounds to be cleaned by the cyanide solution, leaving a zinc sulfide surface which will function normally toward the flotation process. With United Verde mine ore whether or not this theory of deactivation of zinc sulfide particles is correct, I obtain the desired results of deactivation so that a much better differential separation of a copper concentrate can be obtained by flotation. After the removal of a copper concentrate I reactivate the zinc minerals toward flotation by the addition of a copper sulfate solution, preferably increase the causticity due to lime and proceed to concentrate the zinc minerals by flotation, leaving most of the iron sulfide minerals in the tailing.

The method of applying cyanide solution can be varied. I have made up a pulp of the comminuted sulfide ore with one ton of water per ton of solids into which varying amounts of cyanide were introduced. The amounts of cyanide demanded are greater than those used in previous practice for deadening of iron minerals. In treating ores from the Jerome, Arizona, mines I have found two and one-half to five pounds of cyanide per ton of ore to be most efficacious in the above pulp. This is more than the amount of cyanide heretofore customarily used. The reason is that I wish not merely to accelerate corrosion of the pyrite and similar mineral surfaces, but to actually dissolve from the zinc sulfides the film of copper or other compounds which have activated it toward flotation. My process functions best when sufficient cyanide is used to leave a slight excess after treatment of the ore. Thus, when five pounds of cyanide were used in a 15 minute treatment of United Verde ore pulp, about 90% of the cyanide was consumed. If all the cyanide were consumed, copper in the cuprocyanide reaction product could again activate the zinc sulfide minerals. Slightly better recoveries of copper minerals, after cyanidation, are noticed and therefore I have concluded that corrosion films must be removed by the cyanide from the copper minerals also, whereas similar effects are not noticed with the pyrite. Another effect which I have noticed is that the flotation concentrates contain an increased percentage of the silver and gold minerals of the ore, and I have concluded that they have likewise been cleaned by the cyanide solution.

The period of time required for contact of the cyanide solution with the ore is relatively short. I have found that only five to thirty minutes time of contact is necessary, and that, in fact, with increased time more cyanide is consumed by the ore and a copper concentrate of poorer grade is obtained. I prefer to use enough cyanide to produce the desired effect without leaving a great excess of free cyanide at the end of the treatment. When sufficient amounts of cyanide are used to justify recovery of the cyanogen from the complex cyanides in the solution, the pulp should be de-watered by decantation and filtration or by either alone and the complex cyanide solution treated by known methods for revivification of the alkali or alkaline earth cyanide. This treatment is beneficial because it removes complex solutions from the flotation pulp prior to flotation, allowing the flotation to be carried out under better conditions. This is especially true when large amounts of cyanide have been used for deactivation of the zinc sulfide, it being almost invariably found advisable to replace the resulting solution with clean water of the proper alkalinity.

Flotation treatment of pulp containing too much cyanide or its reaction products is not satisfactory. For instance, with United Verde ore, containing chalcopyrite and marmatite, up to 2.5 lb. potassium cyanide per ton of ore permits removal of a clean brassy-appearing chalcopyrite froth but for higher amounts of cyanide the copper float is darker, is slimy and dirty in appearance and more copper appears in the zinc concentrate, but the total copper extraction in the two concentrates remains satisfactory for a considerable excess of cyanide or its reaction products. Leaving the reaction products or the excess cyanide in the pulp also causes more zinc mineral to appear in the copper concentrate than when the cyanide solution is separated to a large extent from the ore pulp before the flotation operation. Such separation of solution is desirable but not essential.

The following examples illustrate the improved results which may be obtained by using the process of my invention:

Treatment of complex copper-zinc-iron sulfide ore from the United Verde mine at Jerome, Arizona, using the customary amounts of frothing and collecting agents, alkaline salts, and activating agents for the recovery of separate copper and zinc concentrates yielded the following results:—

| Product | Copper | Zinc | Extraction | |
|---|---|---|---|---|
| | | | Copper | Zinc |
| | Per cent | Per cent | Per cent | Per cent |
| Heading | 1.9 | 6.6 | 100.0 | 100.0 |
| Cu conc | 6.66 | 23.8 | 72.5 | 59.7 |
| Zn conc | 1.53 | 11.6 | 17.5 | 33.7 |
| Tailing | 0.26 | 0.76 | 10.0 | 6.6 |

Treatment of the same ore in accordance with the process of my invention by first subjecting a pulp made alkaline with lime to the action of cyanide, filtering washing and repulping the residue and then using the same customary amounts of frothing and collecting agents, alkaline salts, and activating agents for the recovery of separate copper and zinc concentrates yielded the following results:—

| Product | Copper | Zinc | Extraction | |
|---|---|---|---|---|
| | | | Copper | Zinc |
| | Per cent | Per cent | Per cent | Per cent |
| Cu conc | 9.48 | 7.5 | 75.0 | 13.9 |
| Zn conc | 1.14 | 22.1 | 16.3 | 75.3 |
| Tailing | .24 | 1.18 | 8.7 | 10.8 |

One great advantage of the process of the present invention over the heretofore customary processes is that the heretofore customary processes have been effective only on fresh ore. If ore has been partially weathered before mining or has been broken by mining methods which leave it underground subject to oxidizing influences for some time before delivery to the mill, formation of soluble copper compounds by oxidation provides the necessary activator for the zinc sulfide minerals, making a differential flotation separation, by the heretofore customary processes, imperfect, difficult or even impossible. Even too long a period of conditioning the ore pulp in the mill before submitting to flotation will cause oxidation and activation of the zinc sulfide minerals, thereby in part nullifying the attempts at differential flotation.

In this specification, the expression "zinc sulfide minerals" has been used to include pure sphalerite and those minerals, like marmatite, in which part of the zinc is replaced by another metal. The United Verde zinc sulfide mineral is a marmatite which averages about 90% ZnS and the remainder is FeS, which imparts to it a silvery black color instead of the resin yellow of pure sphalerite. The expression "copper sulfide minerals" includes chalcopyrite and chalcocite, the usual minerals of a zinc-copper ore, and also bornite and covellite.

I claim:—

1. The method of treating ores containing sulfides of copper and zinc which comprises treating an alkaline pulp of the ore with a cyanide, removing soluble compounds from the ore pulp, and subjecting the thus treated ore to a froth flotation operation to recover a copper concentrate.

2. The method of treating ores containing chalcopyrite and marmatite which comprises treating an alkaline pulp of the ore with a cyanide, removing soluble compounds from the ore pulp, and subjecting the thus treated ore to a froth flotation operation to recover a copper concentrate.

3. The method of treating ores containing sulfides of copper and zinc which comprises treating a pulp of the ore with lime and a cyanide, removing the soluble compounds from the ore pulp, and subjecting the thus treated ore to a froth flotation operation to recover a copper concentrate.

4. The method of treating ores containing chalcopyrite and marmatite which comprises treating a pulp of the ore with lime and a cyanide, removing the soluble compounds from the ore pulp, and subjecting the thus treated ore to a froth flotation operation to recover a copper concentrate.

5. The method of treating ores containing sulfides of copper and zinc which comprises treating a pulp of the ore with an alkaline salt and cyanide, removing the soluble compounds from the ore pulp, subjecting the thus treated ore to a froth flotation operation to recover a copper concentrate, treating the remaining ore pulp with an alkaline salt, and subjecting the thus treated remaining ore pulp to a froth flotation operation to recover a zinc concentrate.

6. The method of treating ores containing chalcopyrite and marmatite which comprises treating a pulp of the ore with lime and a cyanide, removing the soluble compounds from the ore pulp, subjecting the thus treated ore to a froth flotation operation to recover a copper concentrate, treating the remaining ore pulp with an alkaline salt, and subjecting the thus treated remaining ore pulp to a froth flotation operation to recover a zinc concentrate.

7. The method of treating ores containing chalcopyrite, marmatite and pyrites which comprises treating a pulp of the ore with lime and a cyanide, removing the soluble compounds from the ore pulp, subjecting the thus treated ore to a froth flotation operation to recover a copper concentrate, treating the remaining ore pulp with an alkaline salt, and subjecting the thus treated remaining ore pulp to a froth flotation operation to recover a zinc concentrate.

8. The method of treating ores containing sulfides of copper, zinc and iron which comprises treating a pulp of the ore with lime and a cyanide, filtering the thus treated pulp, repulping the residue in an alkaline solution, subjecting the resulting pulp to a froth flotation operation to recover a copper concentrate, treating the remaining pulp with an alkaline salt, and subjecting the thus treated remaining ore pulp to a froth flotation operation to recover a zinc concentrate.

9. The method of treating ores containing chalcopyrite, marmatite and pyrites which comprises treating a pulp of the ore with lime and a cyanide, filtering the thus treated pulp, repulping the residue in an alkaline solution, subjecting the resulting pulp to a froth flotation operation to recover a copper concentrate, treating the remaining pulp with an alkaline salt, and subjecting the thus treated remaining ore pulp to a froth flotation operation to recover a zinc concentrate.

OLIVER C. RALSTON.